(12) United States Patent
Burgin et al.

(10) Patent No.: US 9,495,883 B2
(45) Date of Patent: Nov. 15, 2016

(54) SYSTEM AND METHOD FOR DISPLAYING A PROCEDURE TO AN AIRCREW MEMBER

(75) Inventors: Roger W. Burgin, Scottsdale, AZ (US); Pramod Kumar Malviya, Karnataka (IN); Dave Pepitone, Sun City West, AZ (US); Keith Hughes, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 957 days.

(21) Appl. No.: 13/196,360

(22) Filed: Aug. 2, 2011

(65) Prior Publication Data

US 2013/0035848 A1 Feb. 7, 2013

(51) Int. Cl.
| | | |
|---|---|---|
| G01C 23/00 | (2006.01) | |
| G09B 5/06 | (2006.01) | |
| G08G 5/00 | (2006.01) | |
| G08G 5/02 | (2006.01) | |

(52) U.S. Cl.
CPC .............. *G09B 5/06* (2013.01); *G01C 23/00* (2013.01); *G08G 5/0021* (2013.01); *G08G 5/025* (2013.01)

(58) Field of Classification Search
CPC .................. G01C 23/00; G08G 5/0021; G08G 5/025; G09B 5/06
USPC .................................................. 701/14, 528
See application file for complete search history.

(56) References Cited

U.S. PATENT DOCUMENTS

| | | |
|---|---|---|
| 4,138,726 A | 2/1979 | Girault et al. |
| 5,442,556 A | 8/1995 | Boyes et al. |
| 5,936,552 A | 8/1999 | Wichgers et al. |
| 6,381,538 B1 | 4/2002 | Robinson et al. |
| 6,691,004 B2 | 2/2004 | Johnson et al. |
| 6,922,631 B1 | 7/2005 | Dwyer et al. |
| 7,570,177 B2 | 8/2009 | Reynolds et al. |
| 7,714,744 B1 | 5/2010 | Wichgers |
| 7,881,866 B2 | 2/2011 | Meunier et al. |
| 2003/0060940 A1 | 3/2003 | Humbard et al. |

(Continued)

FOREIGN PATENT DOCUMENTS

| | | |
|---|---|---|
| CN | 101027618 A | 8/2007 |
| FR | 2847553 A1 | 5/2004 |
| WO | 2010014804 A2 | 2/2010 |

OTHER PUBLICATIONS

EP search report for EP 12177928.4-1958 / 2573744 dated May 26, 2015.

(Continued)

*Primary Examiner* — Michael D Lang
(74) *Attorney, Agent, or Firm* — Lorenz & Kopf, LLP (57) ABSTRACT

A system and method is disclosed for displaying a procedure to an aircrew member of an aircraft. The system includes, but is not limited to, a moving map display, a position detecting unit, a flight management system, an electronic storage unit for storing navigation procedures associated with geographic locations, and a processor coupled with the moving map display, the position detecting unit, the flight management system, and the electronic storage unit. The processor is configured to receive a current location of the aircraft from the position determining unit and a flight path from the flight management system, to retrieve a navigation procedure from the electronic storage unit corresponding to the current location and the flight path of the aircraft, and to command the moving map display to display a graphic depiction of the flight path.

20 Claims, 8 Drawing Sheets

(56) References Cited

U.S. PATENT DOCUMENTS

| | | |
|---|---|---|
| 2007/0138345 A1 | 6/2007 | Shuster |
| 2008/0154447 A1 | 6/2008 | Spinelli |
| 2008/0195309 A1* | 8/2008 | Prinzel, III et al. .......... 701/208 |
| 2009/0125222 A1 | 5/2009 | McCullough et al. |
| 2009/0319100 A1 | 12/2009 | Kale et al. |
| 2010/0148991 A1 | 6/2010 | Aspen et al. |
| 2011/0264312 A1* | 10/2011 | Spinelli et al. ................. 701/16 |

OTHER PUBLICATIONS

CN Office Action for Application No. 201210336296.5 dated Aug. 5, 2015.
EP Summons to Oral Proceedings for Application No. 12177928.4-1958/2573744 dated Mar. 29, 2016.
CN Second Office Action for for Application No. 201210336296.5 CN dated Mar. 15, 2016.
EP Examination Report for EP 12177928.4-1958 / 2573744 dated Jun. 16, 2015.
CN Third Office Action for for Application No. 201210336296.5 dated Aug. 26, 2016.
EP Communication for Application No. 12177928.4-1958 dated Sep. 8, 2016.

\* cited by examiner

SYSTEM AND METHOD FOR DISPLAYING A PROCEDURE TO AN AIRCREW MEMBER

TECHNICAL FIELD

The present invention generally relates to aviation, and more particularly relates to a system and method for displaying a procedure to an aircrew member.

BACKGROUND

Paper-based charts have been used for decades to assist a pilot and/or other members of an aircrew with navigation of an aircraft. Paper-based charts (which also include PDF files depicting such charts) contain navigation procedures that an aircraft is required to follow at various stages throughout a flight. A procedure is a maneuver that an aircraft is required to undertake when it reaches a predetermined position. For example, a paper-based chart may include a depiction of a flight path together with annotations that indicate the course and the altitude that an aircraft is required to fly and maintain when approaching an airfield for landing. Another example would include the courses and altitude an aircraft may be required to fly and maintain while in a holding pattern above an airport when awaiting clearance to land.

Over the years, as aviation technologies have advanced, many new innovations have made their way into the cockpit. Several innovations have been introduced that facilitate the navigation of an aircraft. One such innovation is a moving map display system. Such systems are well known in the art and are commonly associated with an aircraft's navigation system. The moving map display system works in conjunction with a position detecting system (e.g., GPS) to depict a map or an emulation of the ground on a display screen in the cockpit of the aircraft. As the aircraft flies along its flight path, the map displayed on the display screen appears to move in a manner that corresponds with the current position and heading of the aircraft, to emulate the passage of terrain beneath the aircraft and to show the current position of the aircraft with respect to the terrain or map.

A recent innovation has been to display procedures from a paper-based chart on the moving map display. This reduces the workload on the pilot by eliminating the need to reference both the paper based chart and the moving map display. Additionally, this combined display eliminates the need for the pilot to mentally transpose the procedure onto the moving map display, thus reducing the pilot's level of task saturation. While combining the procedure from a paper-based chart with a moving map display is useful, there is room for improvement.

One limitation of such a system is the fact that the procedures that are illustrated on a paper-based chart (and, consequently depicted on a moving map display) are generic and do not reflect either dynamic conditions (e.g., bank angle, roll rate, ground speed, etc.) or environmental conditions (e.g., altitude, wind speed, wind direction, etc.) experienced by the aircraft as it flies the procedure. Such dynamic and environmental conditions can have a substantial impact on the flight path taken by an aircraft. For example, a tail wind or a head wind may increase or diminish the distance that will actually be traveled by an aircraft when following the published procedure. Such increased or diminished travel, however, would not be reflected by the procedure that is displayed on the moving map. Rather, the published procedure will remain static. Accordingly, displaying the published procedure on the moving map does not allow the pilot to see, in advance, the flight path that his or her aircraft will actually take when he or she executes the procedure. This, in turn, may have an impact on the pilot's ability to foresee flight-path-related issues such as, but not limited to, compliance with airspace or ground obstacle restrictions.

Accordingly, it is desirable to provide a system that can portray procedure-related information to pilots and/or other aircrew members in a manner that is reflective of real-time conditions of, or encountered by, the aircraft. In addition, it is desirable to provide a method that provides for the portrayal of procedure-related information to pilots and/or other aircrew members in a manner that is reflective of real-time conditions of, or encountered by, the aircraft. Furthermore, other desirable features and characteristics of the present invention will become apparent from the subsequent detailed description of the invention and the appended claims, taken in conjunction with the accompanying drawings and this background of the invention.

BRIEF SUMMARY

Various embodiments of a system and method are disclosed herein for displaying a procedure to assist an aircrew member in the navigation of an aircraft.

In a first, non-limiting embodiment, the system includes, but is not limited to, a moving map display subsystem that is configured to display a map that moves in a manner that corresponds with a movement of the aircraft. The system further includes a position detecting subsystem that is configured to detect a current location of the aircraft with respect to a ground surface and to generate a first signal indicative of the current location of the aircraft. The system further includes a flight management subsystem that is configured to determine a flight path that will be taken by the aircraft and to generate a second signal that is indicative of the flight path of the aircraft. The system further includes an electronic storage unit that is configured to store a plurality of navigation procedures associated with a corresponding plurality of geographic locations. The system still further includes a processor that is operatively coupled with the moving map display subsystem, the position detecting subsystem, the flight management subsystem, and the electronic storage unit. The processor is configured to receive the first signal from the position determining subsystem and to receive the second signal from the flight management subsystem. The processor is further configured to retrieve a navigation procedure from the electronic storage unit. The navigation procedure corresponds to the current location of the aircraft and the flight path of the aircraft. The processor is further configured to command the moving map display subsystem to display a graphic depiction of the flight path on the map.

In a second, non-limiting embodiment, the method includes, but is not limited to the step of detecting with a position detecting system a current location of the aircraft. The method further includes the step of determining with a flight management system a flight path that will be taken by the aircraft. The method further includes the step of obtaining from an electronic storage device a navigation procedure for a geographic location that corresponds with the current location and the flight path of the aircraft. The method still further includes displaying on a display unit a moving map that corresponds with the current location of the aircraft and a depiction of the flight path of the aircraft on the moving map.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved system and method for displaying a procedure to an aircrew member onboard an aircraft is disclosed herein. The system includes a moving map display system, a position determining system, a flight management system, an electronic storage unit that is configured to store multiple navigation procedures that correspond with multiple geographic locations, and a processor coupled with each of these systems/components. In some embodiments, the processor may be integral with or otherwise associated with any one of these systems/components while in other embodiments the processor may be a separate, standalone component.

The processor is configured to receive position information from the position detecting system and to receive flight path related information from the flight management system that takes into consideration real-time considerations. Thus, the processor is enabled to determine where the aircraft is and where the aircraft is heading. The processor is further configured to retrieve a navigation procedure from the electronic storage unit. The navigation procedure obtained by the processor from electronic storage unit corresponds with the current location of the aircraft and the flight path of the aircraft. For example, if the processor determines from the information provided by the position detecting system that the aircraft twenty miles west of the geographic location, such as an airfield, and the processor further determines from the information provided by the flight management system that the flight path of the aircraft will take the aircraft to the airfield, the processor will retrieve a navigation procedure for approaching and landing at the airfield. The processor is further configured to command the moving map display subsystem to display a graphic depiction of the aircraft's flight path on the map. This allows the pilot to see the actual flight path that will be taken by his or her aircraft with respect to moving map display. This, in turn, provides the pilot with a considerable advantage over a moving map display that merely displays a published navigation procedure. With the actual flight path displayed to the pilot, the pilot can determine with greater accuracy whether the aircraft's current flight path will comply with applicable airspace restrictions and/or air traffic control directives. Displaying the actual flight path on the moving map display also enables the pilot to take corrective measures when the displayed flight path indicates that the aircraft will be out of compliance with such restrictions and/or directives.

A greater understanding of a system and method for displaying a procedure to an aircrew member onboard an aircraft may be obtained through a review of the illustrations accompanying this application together with a review of the detailed description that follows.

Figure 1:
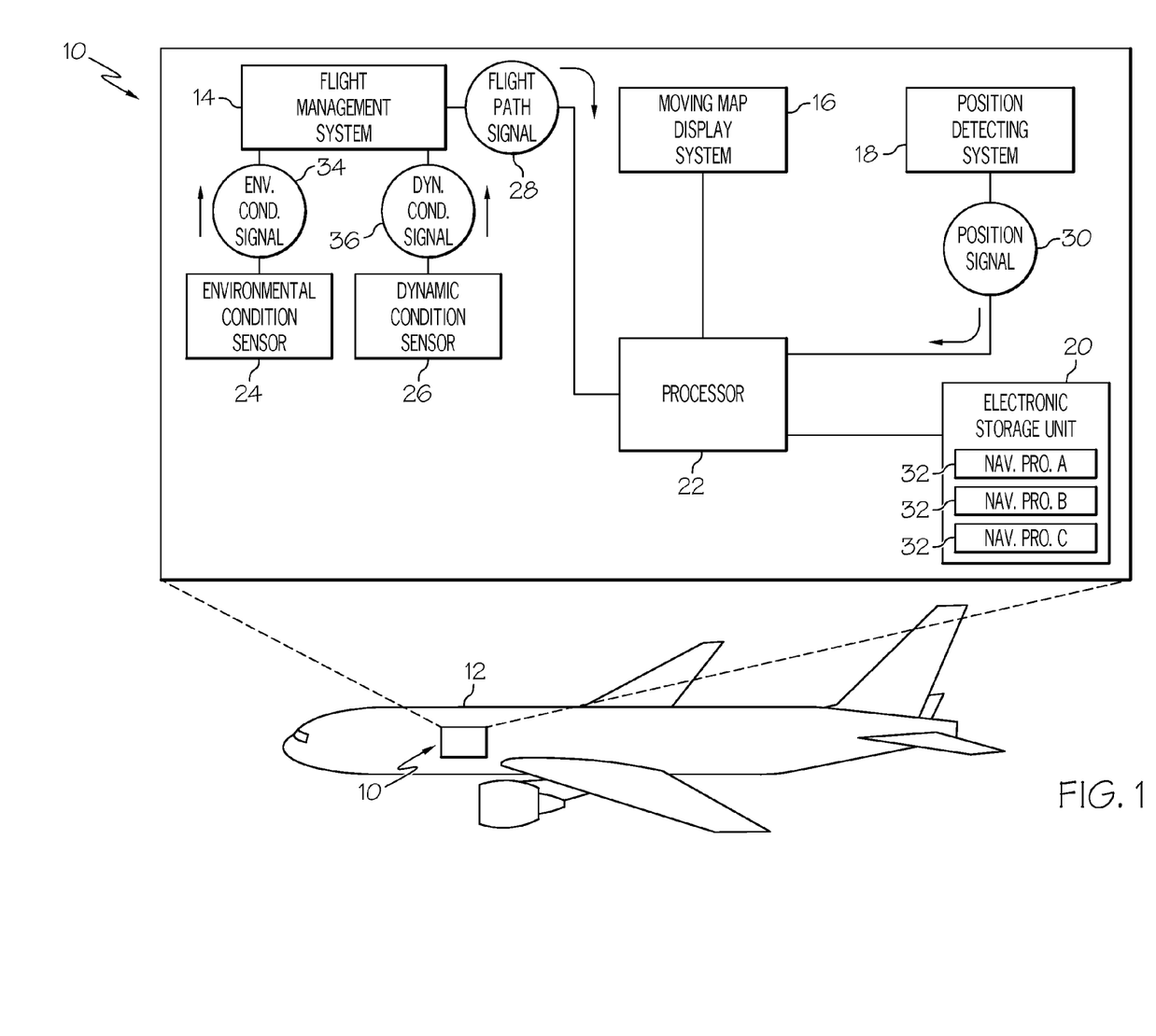
FIG. 1 is a schematic view illustrating an embodiment of a system for displaying a procedure to an aircrew member of an aircraft.

FIG. 1 is a schematic view illustrating an embodiment of a system 10 for displaying a navigation procedure to an aircrew member of an aircraft 12. In the illustrated embodiment, system 10 is configured to be mounted on board aircraft 12, for example as part of an avionics package. In other embodiments, system 10 or components thereof may be remotely located, for example, at an air traffic control facility, and the information needed to display the navigation procedure to the aircrew member may be communicated to aircraft 12 wirelessly over an electronic datalink or otherwise. It should be understood that, although the context for the discussion below is with respect to the field of aviation, the teachings of the invention disclosed herein are applicable to other fields as well. For example, and without limitation, the teachings of the present invention may be equally applicable to the field of maritime navigation.

System 10 includes a flight management system 14, a moving map display system 16, a position detecting system 18, an electronic storage unit 20, and a processor 22. The embodiment of system 10 illustrated in FIG. 1 further includes an environmental condition sensor 24 and a dynamic condition sensor 26. In other embodiments of system 10, multiple environmental condition sensors 24 and/or multiple dynamic condition sensors 26 may be included while in still other embodiments, environmental condition sensor 24 and/or dynamic condition sensor 26 may be omitted. It should also be noted that, although flight management system 14, moving map display system 16, position detecting system 18, electronic storage unit 20, and processor 22 have been illustrated as separate and distinct components, in other embodiments, one or more of these components may be combined into a single component without departing from the teachings herein. For example, a flight management system may include the electronic storage unit, the processor, and the position detecting system.

Flight management system 14 is operatively coupled with a processor 22 and may comprise any suitable flight management system. Flight management systems are well known in the art. A flight management system (also known as a "FMS") is a fundamental part of a modern aircraft's avionics. A flight management system is a specialized computer system that automates a wide variety of in-flight tasks, reducing the workload on the flight crew. An exemplary flight management system is manufactured by Honeywell under the trade name Pegasus.

A primary function of flight management system 14 is in-flight management of aircraft 12's flight plan. Utilizing various sensors to determine the position of aircraft 12, flight management system 14 can guide the aircraft along its flight plan. The flight plan is generally determined on the ground, before departure either by the pilot or a professional dispatcher, and then entered into flight management system 14. During preflight, other information relevant to managing the flight plan is entered. This can include performance information such as zero fuel weight, fuel weight, passenger weight, cargo weight and center of gravity.

Once in flight, a principal task of flight management system 14 is to determine the current position of aircraft 12. In addition, flight management system 14 uses the various pieces of information available to it, including, but not limited to, the information provided by environmental and dynamic condition sensors, to calculate the flight path that aircraft 12 will take as it follows its flight plan. For example, flight management system 14 can project a flight path of aircraft 12 that takes into consideration the state of the aircraft's groundspeed and the crosswind component encountered by aircraft 12. Flight management system 14 is further configured to generate a flight path signal 28 that contains information indicative of the current position of aircraft 12 and the calculated flight path that aircraft 12 will take.

Moving map display system 16 is operatively coupled with processor 22 and is configured to display a map that moves in a manner that corresponds with the movement of aircraft 12. In some embodiments, moving map display system 16 may consist of only a display screen while in other embodiments, moving map display system 16 may include a wide variety of additional components including a processor, an electronic storage device, and a position determining unit, all working in a concerted manner to display a moving map. Moving map display systems are well known in the art. An exemplary moving map display system is disclosed and described in U.S. Pat. No. 4,138,726, issued to Girault, et al., the disclosure of which is hereby incorporated herein by reference in its entirety.

Position detecting system 18 is operatively coupled with processor 22 and comprises a device or a collection of devices that is/are configured to determine the current position (e.g., latitude, longitude and altitude) of aircraft 12 with respect to the surface of the earth and further configured to generate a positional signal 30 that includes information that is indicative of the current position of aircraft 12. Position detecting system 18 may comprise an onboard navigation system that can include, but is not limited to, an inertial navigation system, a satellite navigation system receiver (e.g., Global Positioning System), VLF/OMEGA, Loran C, VOR/DME, DME/DME, IRS, and/or an altimeter or any combination of the foregoing.

Electronic storage unit 20 is operatively coupled with processor 22 and comprises an electronic memory device that is configured to store data. Electronic storage unit 20 may be any type of data storage component including, without limitation, non-volatile memory, disk drives, tape drives, and mass storage devices and may include any suitable software, algorithms and/or sub-routines that provide the data storage component with the capability to store, organize, and permit the retrieval of data. Electronic storage unit 20 may be configured to store at least a plurality of navigation procedures 32 associated with a corresponding plurality of geographical locations. For example, one navigation procedure may contain information pertaining to the procedure for approaching and landing at a specific airport while another navigation procedure may contain information pertaining to the procedure for flying in a holding pattern above that specific airport or another airport. Other examples of navigation procedures that may be stored in electronic storage unit 20 include, but are not limited to fly over and/or fly-by waypoints and procedure turns. Electronic storage unit 20 may store as many or as few navigation procedures 32 as desired.

Processor 22 may be any type of computer, computer system, or microprocessor that is configured to perform algorithms, to execute software applications, to execute sub-routines and/or to be loaded with and to execute any other type of computer program. Processor 22 may comprise a single processor or a plurality of processors acting in concert. In some embodiments, processor 22 may be dedicated for use exclusively with system 10, while in other embodiments processor 22 may be shared with, or may be associated with, other systems onboard aircraft 12.

Processor 22 is operatively coupled to flight management system 14, moving map display system 16, position detecting system 18, and electronic storage unit 20. Such operative coupling may be implemented through the use of any suitable means of transmission including both wired and wireless connections. For example, each component may be physically connected to processor 22 via a coaxial cable or via any other type of wired connection effective to convey signals. In the illustrated embodiment, processor 22 is directly operatively coupled to each of the other components. In other embodiments, each component may be operatively coupled to processor 22 across a vehicle bus. In still other examples, each component may be wirelessly operatively coupled to processor 22 via a Bluetooth connection, a WiFi connection or the like.

Being operatively coupled provides a pathway for the transmission of commands, instructions, interrogations and other signals between processor 22 and each of the other components. Through this operative coupling, processor 22 may control and/or communicate with each of the other components. Each of the other components discussed above may be configured to interface and engage with processor 22. For example, in some embodiments, flight management system 14 may be configured to receive commands from processor 22 requesting flight path signal 28 and may transmit flight path signal 28 to processor 22 in response to such commands. Moving map display system 16 may be configured to receive commands from processor 22 and to display graphic images in response to such commands. In some embodiments, position detecting system 18 may be configured to automatically provide geographical location information to processor 22 at regular intervals while in other embodiments, position detecting system 18 may be configured to provide geographical location information to processor 22 in response to an interrogation received from processor 22. In some embodiments, electronic storage unit 20 may be configured to receive interrogations from processor 22 and to retrieve and provide data, including one or more navigation procedures 32 to processor 22 in response to such interrogations.

In some embodiments, processor 22 may be configured to interact with, coordinate and/or orchestrate the activities of each of the other components of system 10 for the purpose of displaying to a pilot or other aircrew member the actual flight path that will be taken by aircraft 12 as aircraft 12 execute it required navigation procedure. In a non-limiting example of an implementation of system 10, processor 22 is programmed and/or otherwise configured to obtain flight path signal 28 from flight management system 14 and position signal 30 from position detecting system 18. In some embodiments, processor 22 may be configured to periodically and automatically interrogate flight management system 14 and position detecting system 18 for flight path signal 28 and position signal 30, respectively. In other embodiments, processor 22 may be configured to passively receive flight path signal 28 and position signal 30 when those signals are transmitted by flight management system 14 and position detecting system 18, respectively. In other embodiments, processor 22 may be configured to both request and passively receive flight path signal 28 and position signal 30.

Once processor 22 has obtained flight path signal 28 and position signal 30, processor 22 is configured to utilize the information contained in flight path signal 28 and position signal 30 to command electronic storage unit 20 to provide a navigation procedure 32 that relates to the position and projected flight path of aircraft 12. For example, if aircraft 12 were located 20 miles due west of a particular airport, and if aircraft 12 were on a flight path heading due west, then processor 22 may be configured to determine that aircraft 12 will be landing at that airport. In some embodiments, processor 22 may be further configured to base this determination on additional information accessible to processor 22. For example, the flight plan for aircraft 12 might indicate that the flight will terminate at that particular airport.

Once processor 22 has obtained an appropriate navigation procedure 32 from electronic storage unit 20, processor 22 is configured to command moving map display system 16 to display graphics on the moving map representative of the actual flight path that aircraft 12 will take when executing navigation procedure 32. In other words, the flight path will be displayed instead of merely displaying graphics that are representative of navigation procedure 32.

The graphic that depicts the flight path of aircraft 12 will be reflective of both the dynamic conditions of, and the environmental conditions encountered by aircraft 12 as it flies the procedure. For example, the graphic that depicts the flight path of aircraft 12 will illustrate a longer orbital leg in each direction of a holding pattern when aircraft 12 is traveling at five hundred knots then will be illustrated when aircraft 12 is traveling at two hundred knots. Similarly, the arc of a curve corresponding with the turn that aircraft 12 will make when on approach to a runway will have a radius that corresponds with the velocity of aircraft 12, the bank angle at which aircraft 12 makes the term, or both. Also, the length of an orbital leg of a holding pattern or an outbound leg of a final approach procedure may have a length that corresponds with the headwinds or the tailwinds encountered by aircraft 12 as it flies the procedure. This presentation of the actual flight path to the pilot has great advantages in that it provides the pilot on the moving map display system with information that is tailored to his or her aircraft's abilities and/or to the environmental conditions through which aircraft 12 flies.

In some embodiments, processor 22 may be further configured to command moving map display system 16 to include annotations together with the graphic image depicting the flight path of aircraft 12. For example, processor 22 may be configured to extract from navigation procedure 32 the heading and altitude at which the procedure should be executed and may command moving map display system 16 to include characters adjacent to the depicted flight path that indicate the required heading and altitude.

In some embodiments, processor 22 may be further configured to command moving map display system 16 to display both the published navigation procedure as well as a graphic image that depicts the actual flight path that will be flown by aircraft 12. This allows a pilot to see the effect of real-time conditions on aircraft 12 as it flies the navigation procedure.

Environmental condition sensor 24 may comprise any type of sensor that is effective to sense an environmental condition proximate aircraft 12. For example, and without limitation, environmental condition sensor 24 may comprise an atmospheric pressure sensor, an atmospheric temperature sensor, a wind speed sensor, a wind direction indicated, an altitude sensor, and the like. These and other types of environmental conditions will have a calculable impact on the flight path traveled by aircraft 12 as it flies through the atmosphere. Accordingly, environmental condition sensor 24 is communicatively coupled with flight management system 14 and is configured to generate an environmental condition signal 34. In some embodiments, environmental condition sensor 24 may be further configured to send environmental condition signal 34 to flight management system 14 while in other embodiments, flight management system 14 may be configured to interrogate environmental condition sensor 24 to retrieve environmental condition signal 34.

Dynamic condition sensor 26 may comprise any type of sensor that is effective to sense a dynamic condition or a circumstance impacting a dynamic condition of aircraft 12. For example, and without limitation, dynamic condition sensor 26 may comprise a ground speed indicator, a bank angle indicator, a roll rate indicator, a throttle position indicator, a roll angle limit, and the like. These and other types of dynamic conditions will have a calculable impact on the flight path traveled by aircraft 12 as it flies through the atmosphere. Accordingly, dynamic condition sensor 26 is communicatively coupled with flight management system 14 and is configured to generate a dynamic condition signal 36. In some embodiments, dynamic condition sensor 26 may be further configured to send dynamic condition signal 36 to flight management system 14 while in other embodiments, flight management system 14 may be configured to interrogate dynamic conditions sensor 26 to retrieve dynamic condition signal 36.

Flight management system 14 is configured to use the information contained in environmental condition signal 34 and/or in dynamic condition signal 36 when determining the flight path that will be flown by aircraft 12. For example, if the information contained in environmental condition signal 34 indicates that aircraft 12 is encountering a strong tail wind and if the information contained in dynamic condition signal 36 indicates that aircraft 12 is flying at a relatively high ground speed, flight management system 14 will take these two factors into consideration when generating flight path signal 28. As a result, the pilot of aircraft 12 looking at the moving map display system 16 may observe that the arc of a turn that will be flown by aircraft 12 as aircraft 12 flies in a holding pattern over an airport has a relatively large radius as compared with circumstances where the aircraft is flying at a slower ground speed into headwinds.

Figure 2:
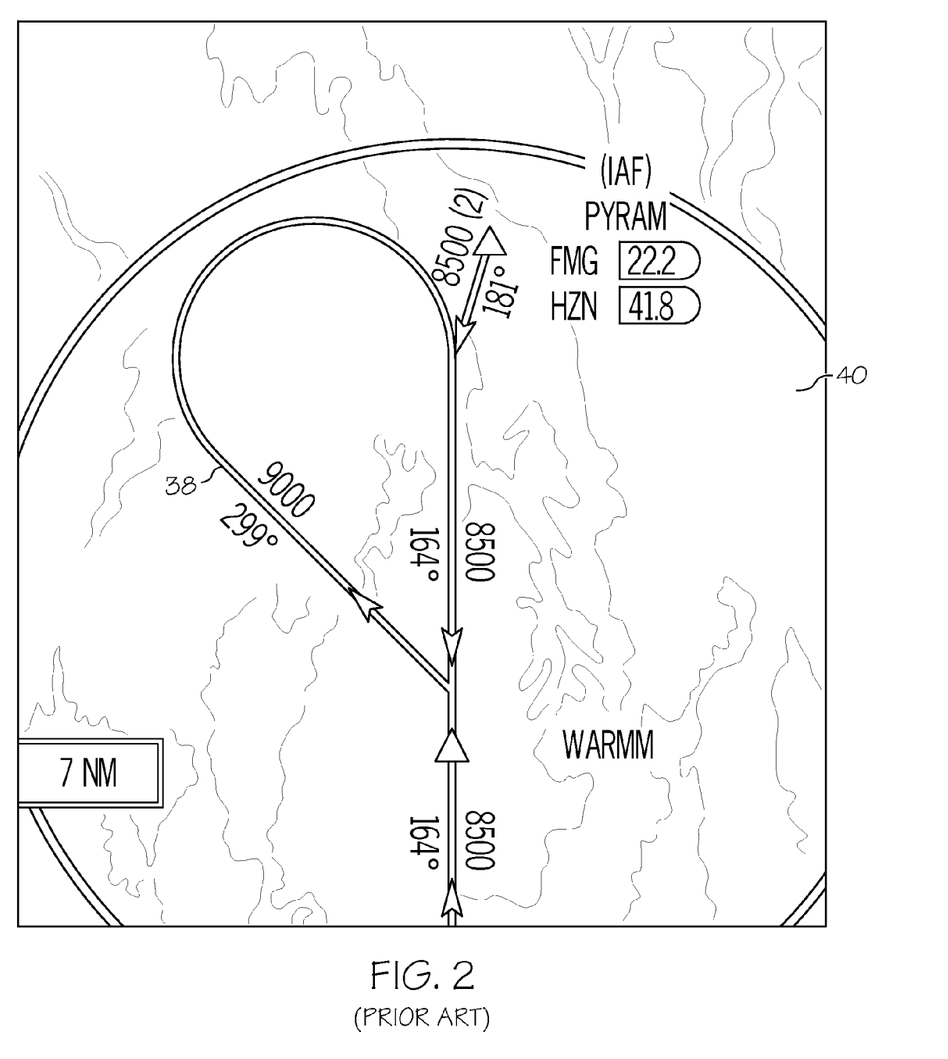
FIG. 2 is a representation of a prior art display illustrating a chart-based procedure for an approach to a runway overlaid onto a moving map.

FIG. 2 is a representation of a prior art display illustrating a chart-based procedure 38 for an approach to a runway overlaid onto a moving map 40. As illustrated, chart-based procedure 38 requires an aircraft to fly due north until reaching way-point WARMM. Once the aircraft has passed way-point WARMM, the aircraft is to execute a left turn and fly at 9000 feet along a course of 299 degrees. After flying along a course of 299 degrees for a predetermined period of time, the aircraft is required to execute a right-hand turn until the aircraft is traveling due south towards the airfield where it will then land. The various segments of the illustrated procedure do not prescribe any specific bank angle or velocity nor do they specify when a particular turn must be made. Thus, chart-based procedure 38 is a static document that provides a pilot with only a general idea of what is required.

Figure 3:
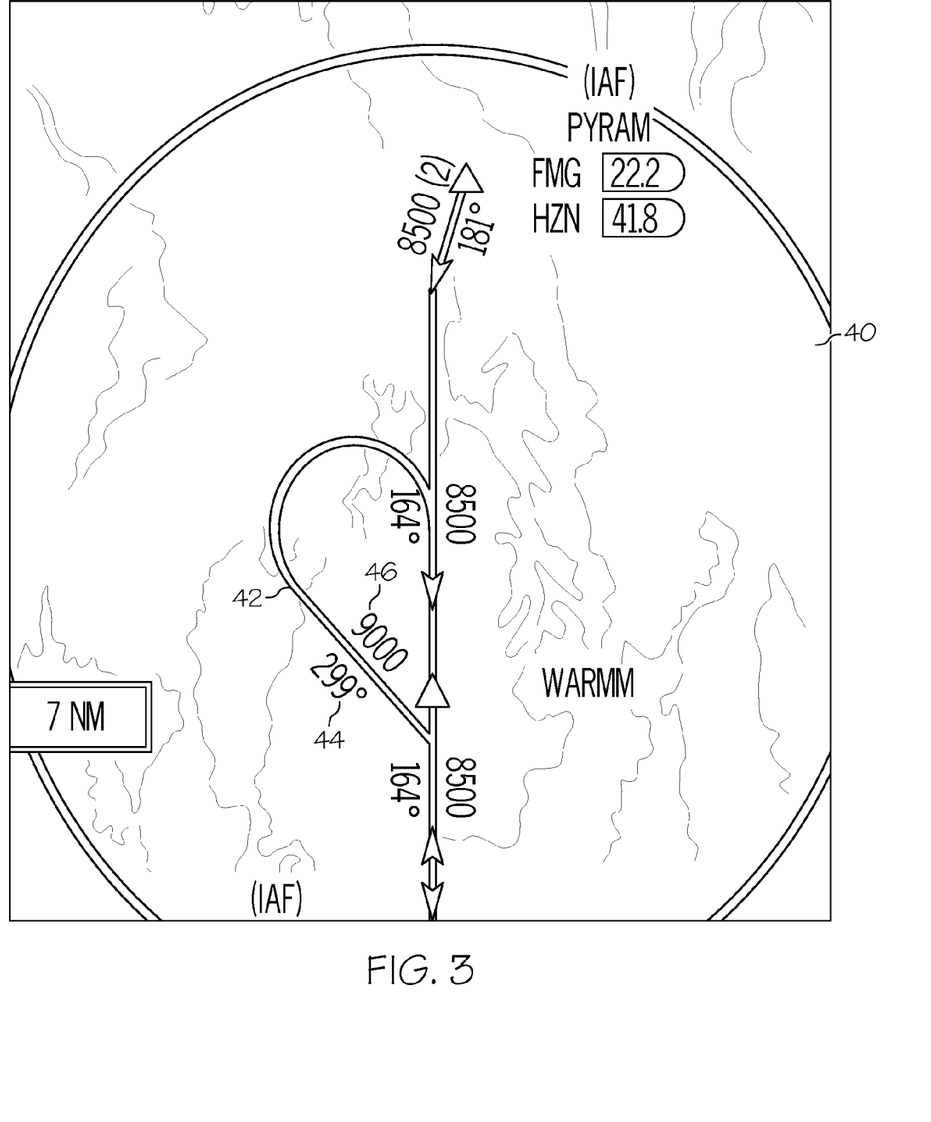
FIG. 3 is a representation of a display generated by the system of FIG. 1 illustrating an annotated flight path for the aircraft as the aircraft approaches the runway, the annotated flight path being overlaid onto a moving map.

With continuing reference to FIGS. 1-2, FIG. 3 is a representation of a display that has been generated by system 10. A graphic image depicting a flight path 42 has been generated by system 10 and displayed on moving map 40. A comparison of FIG. 2 with FIG. 3 reveals that, while flight path 42 shares the same general curved configuration as chart-based procedure 38, the distances traveled by aircraft 12 as it flies along flight path 42 are much less than distances indicated in chart-based procedure 38. Additionally, the curve undertaken by aircraft 12 as it makes its final turn to line up with the runway has a much smaller radius than that indicated by chart-based procedure 38. Additionally, because flight management system 14 recognizes that way-point WARMM is a fly-by type of waypoint (i.e., that the pilot is required to initiate his turn before reaching the waypoint), flight path 42 depicts the requirement that aircraft 12 initiate its turn to a course of 299 degrees prior to reaching way-point WARMM.

Flight path 42 has been annotated with heading annotation 44 and flight level annotation 46. In this manner, system 10 results in the display of information that is more indicative of real-time conditions encountered by aircraft 12 than is provided by chart-based procedure 38 while also providing the same navigation information needed by the pilot to fly the navigation procedure.

Figure 4:
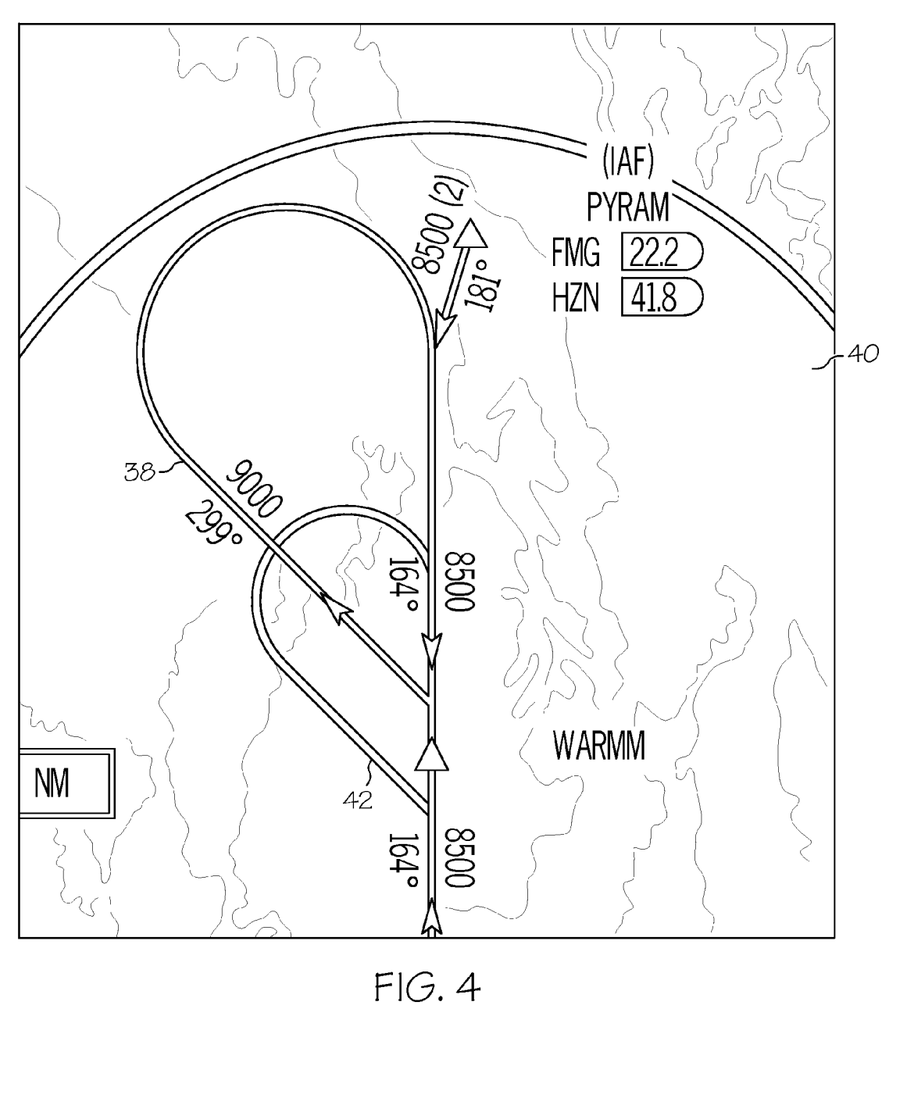
FIG. 4 is an alternate representation of a display generated by the system of FIG. 1 illustrating the annotated flight path for the aircraft as the aircraft approaches the runway and also the chart-based procedure, both overlaid onto the moving map.

With continuing reference to FIGS. 1-3, FIG. 4 is an alternate representation of the output of system 10. In FIG. 4, the pilot is presented with both flight path 42 and chart-based procedure 38. This allows the pilot to see side-by-side both the published navigation procedure and the flight path that aircraft 12 will actually follow.

Figure 5:
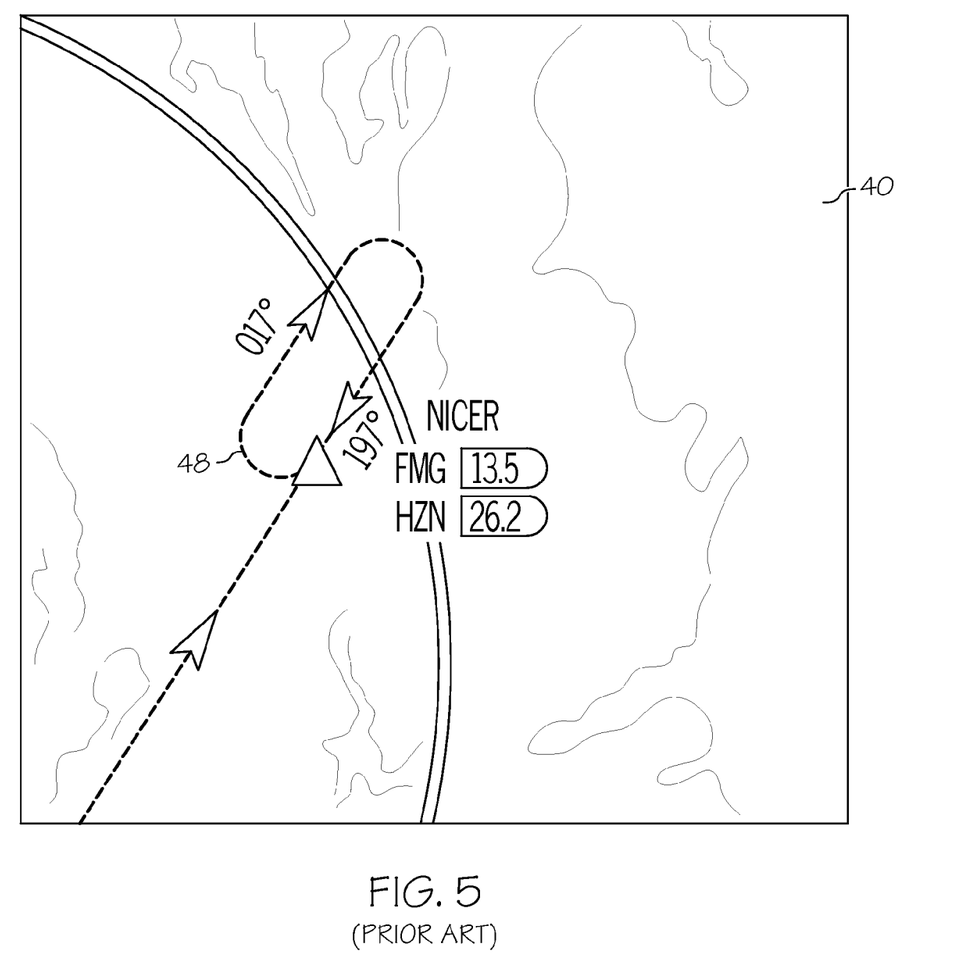
FIG. 5 is a representation of a prior art display illustrating a chart-based procedure for a holding pattern overlaid onto a moving map.

FIG. 5 is a representation of a prior art display illustrating a chart-based procedure 48 for flying in a holding pattern over an airfield overlaid onto moving map 40. As illustrated, a pilot flying the prescribed navigation procedure will orbit over the airfield at a course of 017 degrees followed by a turn to a course of 197 degrees, and then it turned back to a course of 017 degrees, and so on.

With continuing reference to FIGS. 1-5, FIG. 6 is a representation of a display generated by system 10 that shows a flight path 50 that will actually be flown by aircraft 12. A comparison of flight path 50 with chart-based procedure 48 reveals that flight path 50 has much larger legs and much larger diameter turns then are indicated in chart-based procedure 48. This may be because of the performance capabilities of aircraft 12, the environmental conditions encountered by aircraft 12, or combination of these factors.

Figure 6:
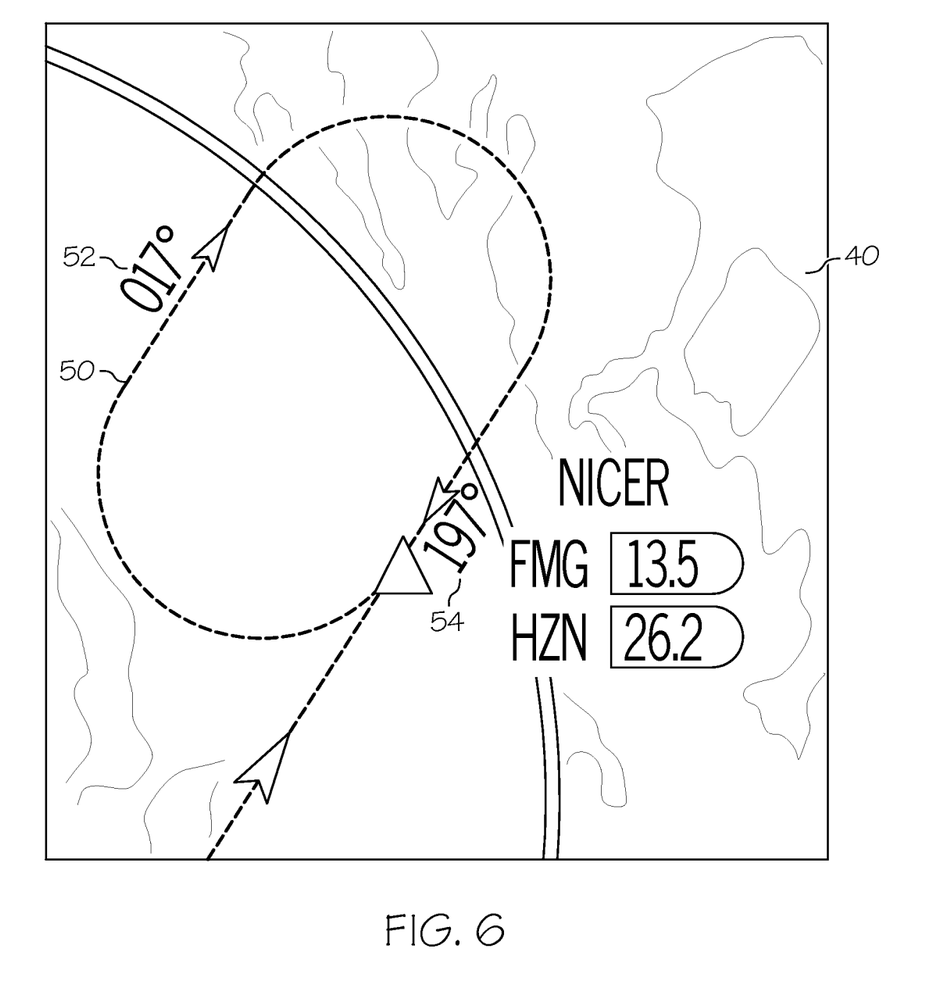
FIG. 6 is a representation of a display generated by the system of FIG. 1 illustrating an annotated flight path for the aircraft as the aircraft flies the holding pattern, the annotated flight path being overlaid onto the moving map.

Also illustrated in FIG. 6 are annotations 52 and 54. Annotations 52 and 54 depict the prescribed heading for aircraft 12 to follow as it travels inbound and outbound legs of the prescribed a holding pattern.

Figure 7:
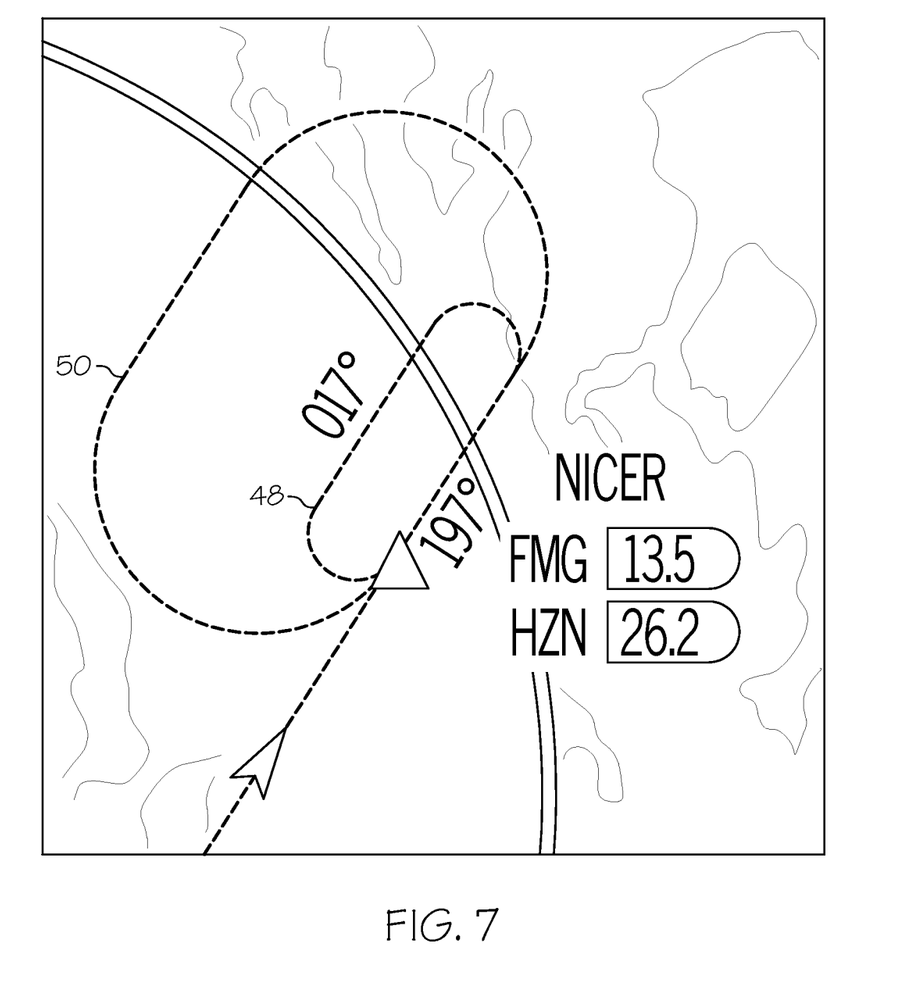
FIG. 7 is an alternate representation of a display generated by the system of FIG. 1 illustrating the annotated flight path for the aircraft flying the holding pattern and also the chart-based procedure, both overlaid onto the moving map.

With continuing reference to FIGS. 1-6, FIG. 7 is an alternate representation of the output of system 10. In FIG. 7, the pilot is presented with both flight path 50 and chart-based procedure 48. This allows the pilot to see side-by-side both the published navigation procedure and the flight path that aircraft 12 will actually follow.

Figure 8:
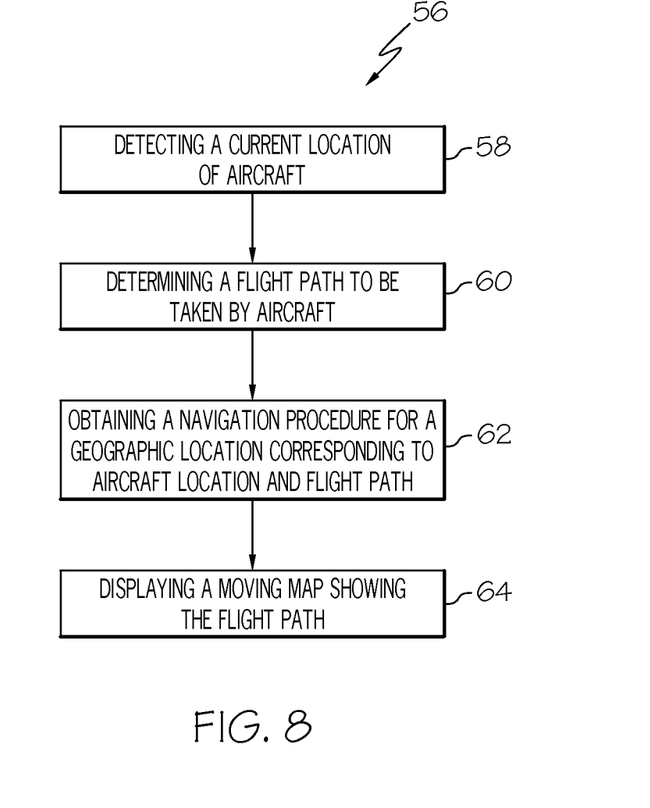
FIG. 8 is block diagram illustrating an embodiment of a method for displaying a procedure to an aircrew member of an aircraft.

FIG. 8 is block diagram illustrating an embodiment of a method 52 for displaying a procedure to an aircrew member of an aircraft. With continuing reference to FIGS. 1-7, at block 58, the current location of the aircraft is detected. This may be accomplished using position detecting system 18, described above, or through the use of any other conventional means for detecting the position of an aircraft.

At block 60, the flight path that aircraft will follow is determined. This may be accomplished using flight management system 14, described above or through the use of any other suitable device or system effective to determine the flight path of aircraft.

At block 62, an applicable navigation procedure corresponding to a specific geographic location that aircraft is heading towards is obtained. This may be accomplished through the use of a processor and an electronic storage unit such as those described above with respect to system 10.

At block 64, the information collected during the execution of the preceding steps is utilized to display a moving map that depicts the flight path that will be followed by the aircraft. In some embodiments, this may include appropriate annotations such as prescribed flight level and heading which may be obtained from the applicable navigation procedure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for displaying a procedure to an aircrew member of an aircraft, the system comprising:
   a moving map display subsystem configured to display a map that moves in a manner that corresponds with a movement of the aircraft;
   a position detecting subsystem that is configured to detect a current location of the aircraft with respect to a ground surface and to generate a first signal indicative of the current location of the aircraft;
   a flight management subsystem configured to determine a flight path that will be taken by the aircraft and to generate a second signal indicative of the flight path of the aircraft;
   an electronic storage unit configured to store a plurality of navigation procedures associated with a corresponding plurality of geographic locations, each navigation procedure representative of a navigation procedure contained on a paper-based chart; and
   a processor operatively coupled with the moving map display subsystem, the position detecting subsystem, the flight management subsystem, and the electronic storage unit,
   wherein the processor is configured to receive the first signal from the position detecting subsystem and to receive the second signal from the flight management subsystem, to retrieve a navigation procedure from the electronic storage unit, the navigation procedure corresponding with the current location of the aircraft and the flight path of the aircraft, and the processor is further configured to command the moving map display subsystem to display, on the map, a graphic depiction of an actual flight path that the aircraft will take when executing the retrieved navigation procedure.

2. The system of claim 1, wherein the processor is further configured to display an annotation together with the graphic depiction of the flight path, the annotation being derived from the retrieved navigation procedure.

3. The system of claim 2, wherein the annotation comprises a flight level.

4. The system of claim 2, wherein the annotation comprises a course.

5. The system of claim 2, wherein the annotation comprises both a flight level and a course.

6. The system of claim 1, wherein the processor is further configured to command the moving map display subsystem to further display the retrieved navigation procedure.

7. The system of claim 1, further comprising an environmental condition sensor configured to sense an environmental condition around the aircraft, the environmental condition sensor being communicatively coupled with the flight management subsystem, and the flight management subsystem configured to determine the flight path of the aircraft based, at least in part, on the environmental condition.

8. The system of claim 7, wherein the environmental condition sensor comprises an atmospheric pressure sensor.

9. The system of claim 7, wherein the environmental condition sensor comprises an atmospheric temperature sensor.

10. The system of claim 7, wherein the environmental condition sensor comprises a windspeed sensor.

11. The system of claim 7, wherein the environmental condition sensor comprises a wind direction indicator.

12. The system of claim 7, wherein the environmental condition sensor comprises an altitude sensor.

13. The system of claim 1, further comprising a dynamic condition sensor configured to sense a dynamic condition of the aircraft, the dynamic condition sensor being communicatively coupled with the flight management subsystem, and the flight management subsystem configured to determine the flight path of the aircraft based, at least in part, on the dynamic condition.

14. The system of claim 13, wherein the dynamic condition sensor comprises a ground speed indicator.

15. The system of claim 13, wherein the dynamic condition sensor comprises a bank angle indicator.

16. The system of claim 13, wherein the dynamic condition sensor comprises a roll rate indicator.

17. The system of claim 1, wherein the flight path comprises an approach procedure.

18. The system of claim 1, wherein the flight path comprises a holding pattern.

19. A method for displaying a procedure to an aircrew member of an aircraft, the method comprising:
    detecting with a position detecting system a current location of the aircraft;
    determining with a flight management system a flight path that will be taken by the aircraft;
    obtaining from an electronic storage device a navigation procedure for a geographic location corresponding with the current location and the flight path of the aircraft, the obtained navigation procedure representative of a navigation procedure contained on a paper-based chart; and
    displaying on a display unit a moving map corresponding with the current location of the aircraft and further displaying, on the moving map, a depiction of an actual flight path that the aircraft will take when executing the obtained navigation procedure.

20. The method of claim 19, further comprising the step of displaying the obtained navigation procedure together with the depiction of the flight path of the aircraft on the moving map.

* * * * *